April 27, 1948.  M. G. CROSBY  2,440,600
ELECTRIC MOTOR CONTROL
Original Filed May 14, 1941
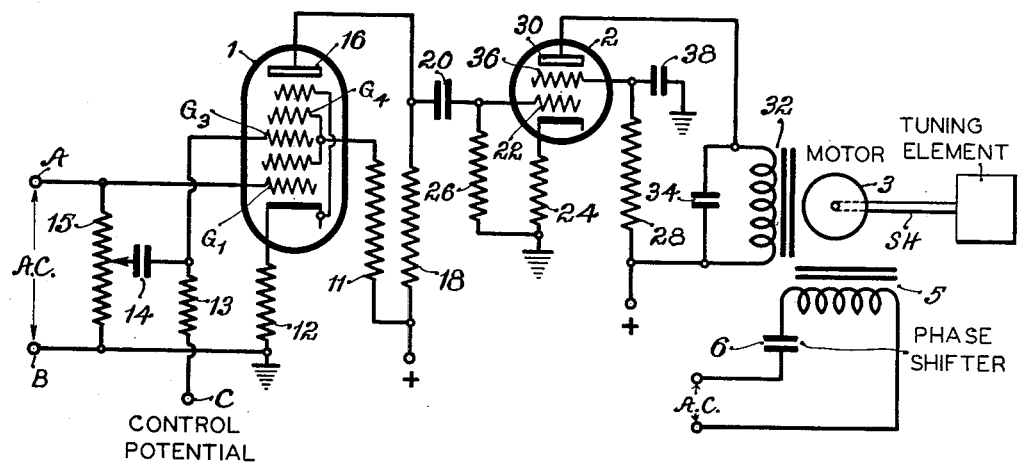
INVENTOR
MURRAY G. CROSBY
BY
ATTORNEY Patented Apr. 27, 1948

2,440,600

UNITED STATES PATENT OFFICE 2,440,600

ELECTRIC MOTOR CONTROL

Murray G. Crosby, Riverhead, N. Y., assignor to Radio Corporation of America, a corporation of Delaware Original application May 14, 1941, Serial No. 393,339. Divided and this application November 18, 1942, Serial No. 465,957

12 Claims. (Cl. 318—257)

This application which is a division of my U. S. application Serial No. 393,339, filed May 14, 1941, now Patent No. 2,380,947, issued August 7, 1945 concerns a new and improved control circuit suitable for control of the direction of rotation of a two-phase motor for usages such as that of automatic frequency control and remote tuning. The circuit has the advantages of extreme simplicity together with all-electronic control and high control sensitivity.

The direction of rotation of the motor is changed by reversing the phase of the current in one motor winding. This phase reversal is obtained by means of the application of a novel effect taking place in a pentode when the screen resistor is unbypassed. As disclosed and claimed in my Patent #2,380,947 dated August 7, 1945, resulting from my said parent application, I have found that when the proper value of unbypassed resistor is used in a two-grid tube of the 6SA7 type, the phase of the voltage amplified by the first grid is reversed. At the same time, the phase relation of the third grid is unaffected so that if voltages of the same phase are fed to the two grids, they will oppose in the output, or plate, circuit. This makes possible the use of a single tube to obtain a balancing action where two were used before.

In describing my invention in detail reference will be made to the attached drawings wherein the single figure illustrates my novel alternating current phase reverser and the same associated with a motor the direction of rotation of which is controlled in a novel manner in accordance with my invention.

The single figure shows an embodiment making use of the principle of the balancing action, obtainable in a two-grid tube, in a control circuit. In this circuit, tubes 1 and 2 serve as amplifiers to amplify the voltage fed to one winding of motor 3, while the other winding is continuously connected to the alternating line voltage through phase-shifting condenser 6. The purpose of condenser 6 is to produce a phase quadrature relation between the currents in the motor windings 5 and 32.

Alternating current voltage of a frequency the same as that applied to winding 5 and of a phase such that the alternating current in winding 32 is substantially in quadrature with that in winding 5 is applied to terminals A and B to produce a potential across potentiometer resistance 15 which is applied to grid G1 and also by way of condenser 14 and resistance 13 to grid G3. A control voltage is fed to terminal C and thence to grid G3. The cathode is connected to ground by a cathode bias resistance 12. The screen grid G4 is charged positive with respect to the cathode by unbypassed resistor 11 and, as pointed out hereinbefore, when the proper value of unbypassed resistor is used in the screen grid direct current circuit of a two-grid tube of the proper type, the phase of the voltage amplified by the first grid is reversed. At the same time the phase relation of the third grid is unaffected, so that if voltages of the same phase are fed to the two grids, they will oppose in the output or plate circuit. By relatively controlling the amplification of the voltages fed to the anode by the two-grids, one or the other thereof can be made large so that it is no longer balanced out in the output circuit. In this manner phase reversal or inversion of an alternating current is obtained. Grid G1 has a positive control of the screen current because it is interposed in the total electron stream flowing from the cathode to the screen. The amplification affected by inserting an unbypassed resistor in the screen produces a voltage swing on the screen that causes the voltage variations at the screen to predominate over those of grid G1 in determining the plate current. The result is one phase reversal between the grid and the screen and a second phase reversal between the screen and the plate. Grid G3 does not have complete control of the screen current since part of the electrons may flow direct from the cathode to the screen without having to pass through grid G3. As a result grid G3 has its predominating control over the plate current and only a small control over the screen current, hence G3 has the single phase reversal of the usual vacuum tube amplifier. Tube 1 amplifies the alternating current, while reversing its phase, and the current is supplied by anode 16 and resistance 18 and coupling condenser 20 to the grid 22 of tube 2. The control grid 22 of tube 2 is biased negative by cathode resistance 24 and grid resistance 26. The anode 30 is connected to the winding 32 of motor 3. This winding is shunted by a condenser 34 which tunes the winding 32 to resonance. The screen grid 36 is charged positive by a direct current circuit through resistance 28 which is bypassed by condenser 38.

In the absence of control voltage at the control terminal C potentiometer 15 is adjusted so that the voltage amplified by G1 exactly balances out the voltage amplified by G3 in resistor 18. Under this condition, there will be no voltage fed through amplifier 2 to winding 32 of the motor so that the shaft SH will not rotate. If a positive voltage is applied to the control terminal C, the balanced condition in tube 1 is upset and a voltage having a phase corresponding to that amplified by G3 is repeated in tube 2 and supplied to the motor winding 32. This causes the motor to rotate in a direction depending upon the relative polarities of windings 32 and 5. If a negative voltage is fed to the control terminal C, the voltage amplified by G1 predominates in the output of tube 1. This voltage has a phase opposite to that amplified by G3 so that the direction of rotation of the motor is reversed. Thus is can be seen that the direction of rotation, and stopping, of the motor is under control of the potentials applied to the control terminal C.

Various tube combinations and circuit element values may be used in my system and I do not propose hereby to limit the same to the particular tubes and circuit element constants listed herein. However, the following are a typical set of experimentally determined circuit constants used in the circuit of Figure 1: Tube 1 is a 6SA7, tube 2 a 6AG7 and the motor a Bodine dynamic braking type KC1. The voltage applied to G1 is about 0.6 volt with about one-half that value fed to G3. The motor starts with plus or minus 0.17 volt applied to the control terminal C. Resistor 12=1500 ohms. Resistor 11=150,000 ohms. Resistor 26=0.5 megohms. Resistor 24=80 ohms. Resistor 28=20,000 ohms. Condenser 20=0.1 microfarad. Condenser 38=1.0 microfarads. Condenser 34=1.0 mircofarads. Total plate current drain from the 250 volt supply is about 35 milliamperes. The alternating current applied at A and B may be tube filament voltage or the same reduced to about one volt. This alternating current may be derived from the source supplying the windings 5.

The control potential applied at C may be of any nature. For example, the said control potential may represent the deviation in frequency of a radio wave being amplified and the motor 3 may tune said amplifier to the wave amplified or the control potential may represent the deviations in mean frequency of a wave length modulated oscillator in which case the motor drives a tuning element in the said oscillator circuit to stabilize said mean frequency of operation. The system obviously may be put to numerous other uses in the radio and associated arts.

What is claimed is:

1. In apparatus for controlling the direction of rotation of a motor having two field producing windings and a rotor, connections to one of said windings for applying alternating current of a first phase to one of said windings, an amplifier tube alternating current phase reverser having output electrodes connected to the other of said windings, said tube having two control grids excited by said alternating current, means including a screening electrode in said tube for reversing the phase of one of the currents amplified in said tube so that the amplified currents on said output electrodes oppose, and a variable bias circuit for one of said control grids for controlling the relative bias of said control grid to cause one of said amplified currents in said output to predominate and be supplied to said other winding.

2. In apparatus for producing an electric field and controlling the direction thereof, two field producing windings, a source of alternating current, connections from said source to one of said windings for feeding alternating current thereto of a first phase, a tube having two control grids, and a cathode and having an output electrode coupled to the other winding, connections from said source to said control grids for applying alternating currents of like phase to said control grids which are amplified in said tube and appear on said output electrode to be fed therefrom to said other winding substantially in phase quadrature with respect to said alternating current of said first phase fed to said one winding, means including a screening electrode in said tube for reversing the phase of one of the voltages amplified on said output electrode, circuits for relatively biasing said control grids with respect to said cathode by an amount such that said amplified alternating currents on said output electrode are substantially equal and compensate and no alternating current is fed to said other winding, and a connection to one of said control grids for varying its bias with respect to the cathode above and below the value at which compensation takes place whereby phase displaced current is fed to said other winding of a phase that reverses as said bias is varied above and below the value at which compensation takes place.

3. In apparatus of the class described, two field producing windings, a source of alternating current, connections from said source to one of said windings for feeding alternating current thereto of a first phase, an amplifier tube having input electrodes and having output electrodes coupled to the other winding, an electron discharge device having two control electrodes and a cathode and having an output electrode coupled to the input electrode of said amplifier tube, connections from said source to said control electrodes for applying alternating currents of like phase to said control electrodes which are amplified in said device and appear on said discharge device output electrode and are fed by said amplifier tube to said other winding in phase displaced relation with respect to said alternating current of said first phase fed to said one winding, means including a screen grid in said electron discharge device and an unbypassed charging resistor therefor for reversing the phase of one of the voltages appearing on said electron discharge device output electrode, circuits for relatively biasing said control electrodes with respect to said cathode by an amount such that said amplified alternating currents on said electron discharge device output electrode are substantially equal and compensate and no alternating current is fed by said amplifier tube to said other winding, and a connection to one of said control electrodes for varying its bias with respect to the cathode above and below the value at which compensation takes place whereby phase displaced current is fed to said other winding of a phase that reverses as said bias is varied above and below the value at which compensation takes place.

4. In apparatus of the class described, two field producing windings, a source of alternating current, connections from said source to one of said windings for feeding alternating current thereto of a first phase, a phase reverser tube having two control grids, a screen grid, and a cathode and having an output electrode coupled to the other winding, connections from said source to said control grids for applying alternating current of like phase to said control grids which are amplified in said tube and appear on said output electrode and are fed therefrom to said other winding in phase displaced relation with respect to said alternating current in said one winding of said first phase, an unbypassed resistor for supplying a direct current potential to said screen grid which is positive relative to the potential of said cathode for reversing the phase of one of the voltages amplified on said output electrode, circuits for relatively biasing said control grids with respect to said cathode by an amount such that said amplified alternating currents on said output electrode are substantially equal and compensate and no alternating current is fed to said other winding, and a connection to one of said control grids for varying its bias with respect to the cathode above and below the value at which compensation takes place whereby phase displaced current is fed to said other winding of a phase that reverses as said bias is varied above and below the value at which compensation takes place.

5. In means for producing an electric field and controlling the direction thereof, a source of alternating current, two field producing windings, connections from said source to one of said windings for feeding alternating current to said one winding, an electron discharge device having an output electrode, a cathode and two control electrodes, connections from said source to said control electrodes for applying alternating currents of substantially like phase to said control electrodes, means for biasing said control electrodes relative to said cathode by biases of such value that currents of substantially like amplitude are amplified on said output electrode, means including a screen grid electrode and a direct current circuit therefor including an unbypassed resistor for reversing the phase of one of the alternating currents amplified on said output electrode so that the alternating current voltages thereon substantially compensate, means for varying the potential on one of said control electrodes so that one of said voltages on said output electrode predominates, and a coupling between said output electrode and the other winding to feed thereto a current of reversible phase in phase displaced relation with respect to the alternating current fed to said one winding.

6. In apparatus for producing an electric field and controlling the direction thereof, two field producing windings, a source of alternating current, an electron discharge device having an output electrode, a cathode, a screen grid and at least two control electrodes, connections for applying alternating voltages from said source to two of said control electrodes, connections for biasing said control electrodes relative to said cathode by potentials such that the voltages amplified by said control electrodes and appearing on said output electrode are of substantially equal values, an unbypassed resistor connected to said screen grid for supplying positive potential thereto, a connection for applying a variable control potential to one of said control electrodes whereby the said voltages relayed to said output electrode are relatively varied in amplitude and one thereof predominates, a coupling between said output electrodes and one of said windings to feed thereto alternating current of reversible phase, and a coupling from said source to said other winding to feed thereto a current of substantially fixed phase which is displaced in phase with respect to the alternating current fed to said one winding.

7. In an arrangement of the class described, a motor having two field producing windings, a source of alternating current coupled to one of said windings for feeding alternating current thereto, an electron discharge device having an anode, a cathode, two control grids, and a screen grid electrode, connections coupling said source to one control grid and the cathode of said device for applying to said one control grid alternating current, a coupling between said source and the other of said control grids for applying to said other control grid alternating current of a phase substantially the same as the phase of the alternating current applied to said one control grid, connections for applying a direct current potential to the anode of said device which is positive relative to the potential on the cathode of said device, an unbypassed resistance for applying a direct current potential to the screen grid of said device which is positive relative to the potential on the cathode of said device whereby the phase of the alternating current amplified by one of the control grids is reversed relative to the phase of the alternating current amplified by the other control grid and the said currents oppose in the anode connections, amplitude adjusting means in one of the couplings between the control grids and said source for adjusting the relative amplitude of the alternating current on said control grids to values such that the amplified alternating currents substantially cancel in said anode connections, connections for applying a variable control potential to one of said control grids such that one or the other of said amplified currents on said anode predominates depending on the value of the control potential, a coupling between the anode of said device and the other winding of said motor, and a phase adjuster in one of said couplings to establish a substantially phase quadrature relation between the alternating currents fed to said field producing windings.

8. In an arrangement of the class described, a motor having two field producing windings, a source of alternating current coupled to one of said windings for feeding alternating current thereto, a resistance coupled to said source of alternating current, an electron discharge device having an anode, a cathode, two control grids between said anode and cathode spaced different distances from said cathode, and a screen grid electrode for the control grid nearest said anode, connections coupling spaced points on said resistance between one control grid and the cathode of said device for applying to said one control grid alternating potential, a cathode biasing resistance in the coupling between said first resistance and the cathode of said device, a coupling condenser between the other of said control grids and said first resistance for applying to said other control grid alternating potential of a phase substantially the same as the phase of the alternating potential applied to said one control grid, connections including said biasing resistance for applying a direct current potential to the anode of said device which is positive relative to the potential on the cathode of said device, an unbypassed resistance for applying a direct current potential to the screen grid of said device which is positive relative to the potential on the cathode of said device whereby the phase of the potential amplified by the one of the control grids is reversed relative to the phase of the potential amplified by the other control grid and the said potentials oppose in the anode connections, amplitude adjusting means in one of the couplings between the control grids and said first resistance for adjusting the relative amplitude of the alternating potentials on said control grids to values such that the amplified alternating potentials substantially cancel in said anode connections, connections for applying a variable control potential to one of said control grids such that one or the other of said amplified potentials on said anode predominates depending on the value of the control potential, a coupling between the anode of said device and the other winding of said motor, and a phase adjuster in one of said couplings to establish a substantially phase quadrature relation between the currents fed to said field producing windings.

9. An arrangement as recited in claim 8 wherein the coupling between the anode of said device and the other winding of said motor includes an amplifier tube.

10. Means for controlling the direction of rotation of the rotor of a motor having field producing windings comprising, a source of alternating current coupled with one of said windings, an electron discharge tube structure including electron discharge producing and electron receiving electrodes, means coupling an electron receiving electrode to another of said windings, a plurality of control electrodes in said tube structure for controlling said discharge, means for impressing alternating currents from said source of substantially relatively fixed phase on two of said control electrodes, and means for controlling the phase of the alternating current applied by said electron receiving electrode to said other of said windings including means for relatively varying the relative biases on said two control electrodes and a screening electrode in said tube structure and a direct current potential circuit therefor including a resistor.

11. Means for controlling the direction of rotation of a motor having field producing windings comprising, a source of alternating current coupled with one of said windings, an electron discharge device having an output electrode coupled with the other of said windings to supply alternating current thereto, and having a plurality of control electrodes and a screen grid electrode, a direct current potential circuit for said screen grid including an unbypassed resistor, means for impressing alternating currents from said source of substantially like phase on a pair of said control electrodes, means for adjusting the relative amplitude of said voltages of substantially like phase, means for relatively adjusting the biases on said pair of control electrodes, and means for adjusting the phase of the alternating current applied to one of said windings.

12. Means for controlling the direction of rotation of the rotor of a motor having field producing windings comprising, a source of alternating current coupled to one of said windings, an electron discharge tube structure including electron discharge producing and electron discharge receiving electrodes, said tube structure also including a screening electrode and a direct current circuit therefor including an unbypassed resistor, means coupling an electron receiving electrode to another of said windings to feed alternating current thereto, a plurality of electron discharge control grids in said tube structure for controlling said discharge, means for impressing alternating currents of substantially like and relatively fixed phases on two of said control grids, and means for relatively varying the relative biases on said control grids to thereby control the phase and amplitude of the alternating current fed by said electron receiving electrode to the other of said windings.

MURRAY G. CROSBY.

REFERENCES CITED

The following references are of record in the file of this patent:

UNITED STATES PATENTS

| Number | Name | Date |
| --- | --- | --- |
| 390,820 | Tesla | Oct. 9, 1888 |
| 1,586,233 | Anschutz-Kaempfe | May 25, 1926 |
| 2,005,153 | Marks | June 18, 1935 |
| 2,020,275 | Beers | Nov. 5, 1935 |
| 2,170,812 | DeLange | Aug. 29, 1939 |
| 2,175,869 | Bernarde | Oct. 10, 1939 |
| 2,183,725 | Seeley | Dec. 19, 1939 |
| 2,209,369 | Wills | July 30, 1940 |
| 2,222,947 | Harrison | Nov. 26, 1940 |
| 2,250,104 | Morrison | July 22, 1941 |
| 2,253,307 | Richter | Aug. 19, 1941 |
| 2,296,092 | Crosby | Sept. 15, 1942 |
| 2,297,800 | Read | Oct. 16, 1942 |
| 2,300,742 | Harrison et al. | Nov. 3, 1942 |
| 2,316,317 | Curtis | Apr. 13, 1943 |
| 2,339,861 | Keeler | Jan. 25, 1944 |

OTHER REFERENCES

"Tube Control of A.-C. Motors," by J. D. Ryder, "Electronics," April 1936, pages 31–33.